United States Patent [19]

Lill

[11] Patent Number: 4,500,201
[45] Date of Patent: Feb. 19, 1985

[54] INDIVIDUAL TOE MEASURING SYSTEM

[75] Inventor: Melvin H. Lill, San Jose, Calif.

[73] Assignee: FMC Corporation, Chicago, Ill.

[21] Appl. No.: 540,911

[22] Filed: Oct. 12, 1983

Related U.S. Application Data

[63] Continuation of Ser. No. 261,445, May 5, 1981, abandoned.

[51] Int. Cl.³ .................. G01B 11/26; G01B 5/255
[52] U.S. Cl. .................. 356/152; 33/203.18;
33/288; 350/6.4; 350/484; 356/155
[58] Field of Search .............. 356/141, 152, 155;
350/6.4, 484; 33/288, 203.18

[56] References Cited

U.S. PATENT DOCUMENTS

| | | |
|---|---|---|
| 2,972,189 | 2/1961 | Holub . |
| 3,091,862 | 6/1963 | MacMillan . |
| 3,135,052 | 6/1964 | MacMillan . |
| 3,307,263 | 3/1967 | Castiglia et al. . |
| 4,058,903 | 11/1977 | Wilkerson . |
| 4,097,157 | 6/1978 | Lill . |
| 4,118,109 | 10/1978 | Crawford ................. 356/6.4 |
| 4,126,943 | 11/1978 | Senften ................. 356/152 |
| 4,130,362 | 12/1978 | Lill et al. . |
| 4,150,897 | 4/1979 | Roberts, Jr. et al. . |
| 4,154,531 | 5/1979 | Roberts, Jr. et al. . |
| 4,159,574 | 7/1979 | Samuelsson et al. ............. 33/288 |
| 4,239,389 | 12/1980 | Hollandsworth et al. . |
| 4,302,104 | 11/1981 | Hunter ................. 356/152 |
| 4,319,838 | 3/1982 | Grossman et al. ............. 356/152 |
| 4,336,658 | 6/1982 | January et al. ............. 356/152 |
| 4,344,234 | 8/1982 | Lill et al. ................. 356/155 |
| 4,364,628 | 12/1982 | Garner ................. 350/484 |

FOREIGN PATENT DOCUMENTS

925691  5/1973  Canada ................. 356/155

Primary Examiner—S. C. Buczinski
Attorney, Agent, or Firm—H. M. Stanley; R. B. Megley

[57] ABSTRACT

An apparatus and method is disclosed which utilizes modified wheel aligner heads and which accomplishes measurement of individual wheel toe on a vehicle having a pair of non-steerable rear wheels and a pair of steerable front wheels. The apparatus and method provides measurement of a steering or a rolling direction for the front and the rear wheel pair as a result of optical measurements taken relating the orientation of the planes of the wheels to the centerline of the vehicle chassis. Once the steering direction of the front wheels is obtained, individual toe measurements for the front wheels may be made relative to the chassis centerline. Alternatively, once the steering or average rolling direction of the rear wheels is obtained individual toe measurements for the rear wheels may be made relative to the chassis centerline and individual toe measurements for the front wheels may be made relative to the rear wheel rolling direction. Neutral steering of the front wheels may thus be made to coincide directionally with the rear wheel rolling direction. The optical measurements are made with an aimable viewfinder utilizing contrarotating plano prisms which are monitored in rotational position to provide data utilized in calculating wheel pair steering direction and correction factors for the measurements taken by the aligner heads.

6 Claims, 10 Drawing Figures

FIG_1

FIG_2

FIG_3

FIG_4  FIG_5

FIG_7

FIG_8

FIG_5

0
INDIVIDUAL TOE MEASURING SYSTEM

This application is a continuation of application Ser. No. 261,445, filed May 5, 1981, now abandoned.

BACKGROUND OF THE INVENTION

1. Field of the Invention

This invention relates to vehicle wheel alignment equipment, and more particularly to such equipment for measuring the angle of toe for individual vehicle wheels either relative to the centerline of the vehicle chassis or relative to the average rolling direction of the non-steerable wheels.

2. Description of the Prior Art

Apparatus providing rearward projecting light beams for use in determining the inclinations of front steerable wheels relative to the axis of rotation of one of the rear non-steerable wheels are found in U.S. Pat. Nos. 4,154,531, Roberts, Jr. et al, issued May 15, 1979; 4,150,897, Roberts, Jr. et al, issued Apr. 24, 1979; 4,130,362, Lill et al, issued Dec. 19, 1978; and 4,097,157, Lill, issued June 27, 1978, all of which are currently assigned to the Assignee of record of the invention disclosed herein. The '531 patent discloses apparatus wherein the rearward projected beam is caused to swing through a predetermined angle. The beam is reflected by a mirror mounted in predetermined relationship with the axis of rotation of one of the rear non-steerable wheels so that the oscillating beam is reflected back to a target mounted on the front steerable wheel on the same side of the vehicle. The time relationship between the instants when the projected oscillating beam is received by light sensitive devices when reflected toward a front wheel mounted target is used to determine the inclination of the front steerable wheel in the horizontal or toe plane.

The '362 patent disclosure provides a multiplicity of beams projected at known angles relative to a reference angle from a projector mounted on one of the steerable front wheels of the vehicle. A mirror mounted on the rear wheel on the same side of the vehicle in predetermined relationship with the axis of rotation of the rear wheel reflects one of the projected beams back to the front wheel assembly. The reflected and received beam from the multiplicity of beams determines the inclination of the front wheel in the horizontal or toe plane.

The '157 patent disclosure makes reference to a rearwardly projected beam which is reflected by a mirror mounted in predetermined relationship with a non-steerable wheel on the same side of the vehicle. The reflected beam is received at an encoding target which is mounted on the front wheel on the same side of the vehicle to provide an indication of the inclination of the front wheel in the horizontal or toe plane relative to the axis of rotation of the rear wheel.

The '897 patent disclosure relates to a rearwardly transmitted light beam from a front steerable wheel mounted assembly which is reflected by a rear wheel mounted mirror having predetermined orientation relative to the axis of rotation of the rear wheel. The front steerable wheels are adjusted in steering direction until the beam reflected from the rear wheel mounted mirror strikes a calibration point on the front wheel mounted assembly. The mirror on the rear wheel is then moved laterally so that the projected beam falls on a scale on the mirror at a point which is related to the desired toe setting for the front steerable wheels of the vehicle. The front steerable wheel is adjusted in toe so that the projected beam moves to a desired location on the rear mirror thereby setting known front wheel toe into the one front steerable wheel. The toe of the other front steerable wheel is set in the usual manner to obtain the desired total front steerable wheel toe. The apparatus automatically adjusts for different vehicle wheel spacings.

SUMMARY OF THE INVENTION

According to the present invention apparatus is provided for measuring individual wheel toe of a steerable wheel pair and a non-steerable wheel pair which support a chassis of a vehicle. An alignment head pair is adapted for mounting equidistant from a center point between the wheel pairs, first on the non-steerable wheel pair and then on the steerable wheel pair. The alignment heads provide an individual toe signal for the wheel on which each head is mounted. Means is provided for receiving the toe signals and for providing a total toe value for the wheels on which the heads are mounted. A sighting system is provided in each alignment head which defines a line of sight generally in a direction longitudinal of the vehicle chassis. Means for adjusting the line of sight is provided so that the line of sight assumes a fixed direction relative to the direction of the plane of the wheel on which the head is mounted. Means is coupled to the means for adjusting for providing an electrical output signal indicative of the line of sight direction relative to respective ones of the wheel planes of the wheel pairs. Further, means is provided for receiving the electrical output signals and for providing a wheel pair steering direction value relative to the chassis centerline when the lines of sight are adjusted to intercept the points near the opposing wheel axes which are equidistant from a center point between the opposing wheel pair. Means is provided for combining one-half of the total toe value and the wheel pair steering direction value to thereby obtain an actual toe value for each of the wheels in the pair. Means for comparing a value corresponding to the individual toe signal at each wheel with the corresponding actual toe value is provided, thereby obtaining a toe correction factor value for each wheel in that wheel pair. Memory means provides for storing the correction factor value, whereby the values corresponding to individual toe are continuously corrected while the wheel toe is adjusted and steering direction is changed.

The method disclosed in conjunction with the apparatus described herein relates to measurement of toe for wheels supporting a vehicle chassis wherein the wheels include pairs of non-steerable and steerable wheels. A pair of alignment heads are utilized which are adapted to be mounted on ones of the wheels and which provide signals indicative of the individual toe of the wheels on which the heads are mounted. An optical system is incorporated in each head having an aimable optical axis extending therefrom. The method includes the steps of mounting an alignment head on each of the non-steerable wheels and aiming each optical axis in a fixed direction at separate ones of a pair of points equidistant from a point on the centerline of the vehicle chassis. An electrical signal is then provided indicative of the angular departure of each aimed optical axis from the plane of the non-steerable wheel on which the respective head is mounted. Combining the angular departure signals and providing a steering or average rolling direction value for the non-steerable wheels is followed by calculating a value indicative of the total toe of the non-steerable wheels utilizing the individual toe signals. The step of combining one-half of the total toe value with the average rolling direction value to obtain an actual toe value is followed by comparing the actual and individual toe values to obtain a toe correction factor. The alignment heads are removed from the non-steerable wheels and mounted on the steerable wheels. Each optical axis is aimed in a fixed direction at separate ones of a pair of points equidistant from the centerline of the vehicle chassis approximately at the position of the non-steerable wheels. An electrical signal is provided indicative of the angular departure of each aimed optical axis from the plane of the steerable wheel on which the respective head is mounted. A value indicative of total toe of the steerable wheels is calculated, wherein the steerable wheel individual toe signals are utilized. One-half of the steerable wheel total toe and the angular departure signal are combined with the stored non-steerable wheel rolling direction signal so that an actual toe signal for each steerable wheel is obtained which is referenced to the non-steerable wheel average rolling direction. The actual toe for one steerable wheel is compared with the individual toe for that wheel to obtain a steerable wheel toe correction factor and the steerable wheel correction factor is stored for application steerable wheel individual toe for other steering angles and toe adjustments.

BRIEF DESCRIPTION OF THE DRAWINGS

FIG. 6 is a sectional view taken along the lines 6—6 of FIG. 5.

DESCRIPTION OF THE PREFERRED EMBODIMENT

Figure 1:
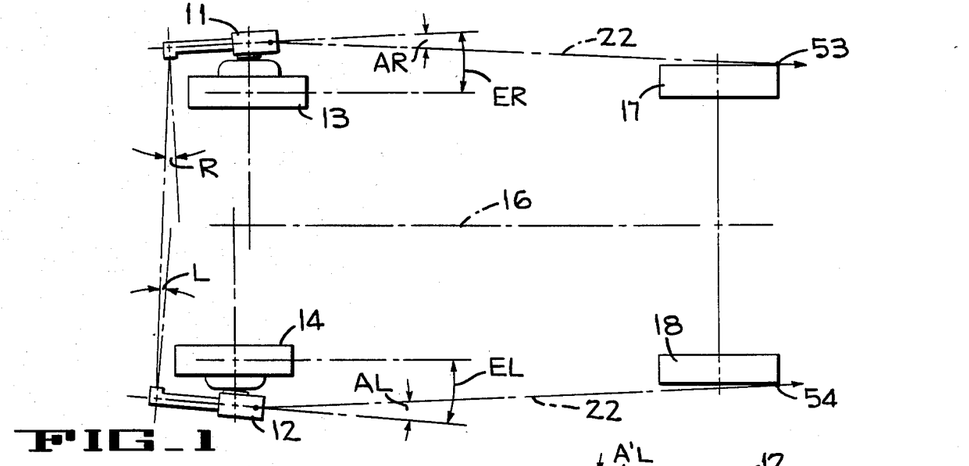
FIG. 1 is a diagrammatic plan view of the apparatus and method of the present invention utilized to measure individual steerable wheel toe relative to a vehicle chassis centerline.

Wheel mounting alignment heads 11 and 12 are shown in FIG. 1 such as those disclosed in U.S. Pat. Nos. 4,097,157 or 4,150,897 mentioned hereinbefore. The alignment heads are mounted on a pair of front steerable wheels 13 and 14 supporting the front end of a vehicle chassis having a centerline 16 passing therethrough. A pair of non-steerable rear wheels 17 and 18 support the rear end of the chassis. The alignment heads 11 and 12 are modified as compared to those disclosed in the aforementioned U.S. Patents. The heads each contain an aimable viewfinder which may best be described by reference to FIGS. 4 through 6.

Figure 4:
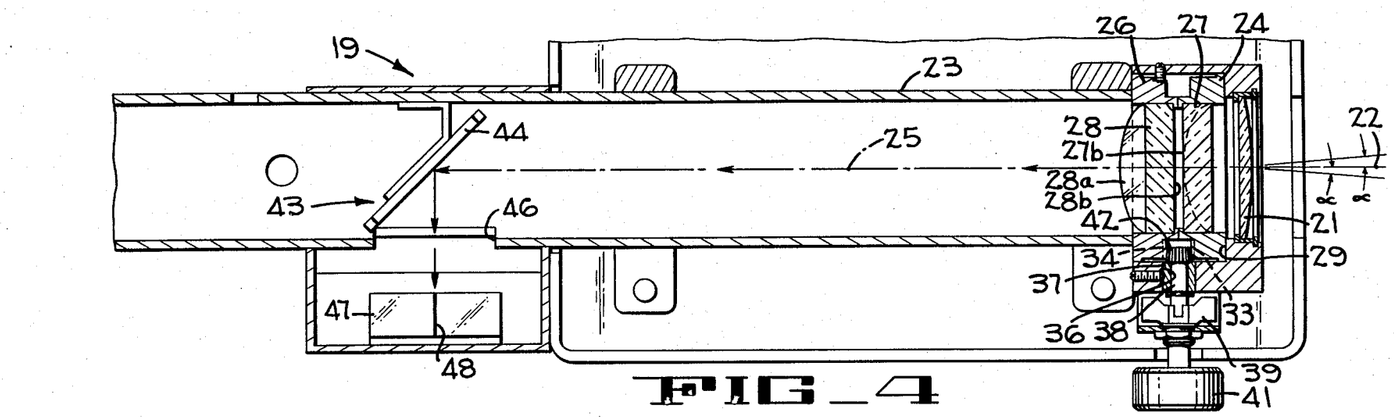
FIG. 4 is a top sectional view of a portion of one of the alignment heads shown in FIGS. 1 through 3 showing the incorporation of an aimable viewfinder in accordance with the present invention.
Figure 5:
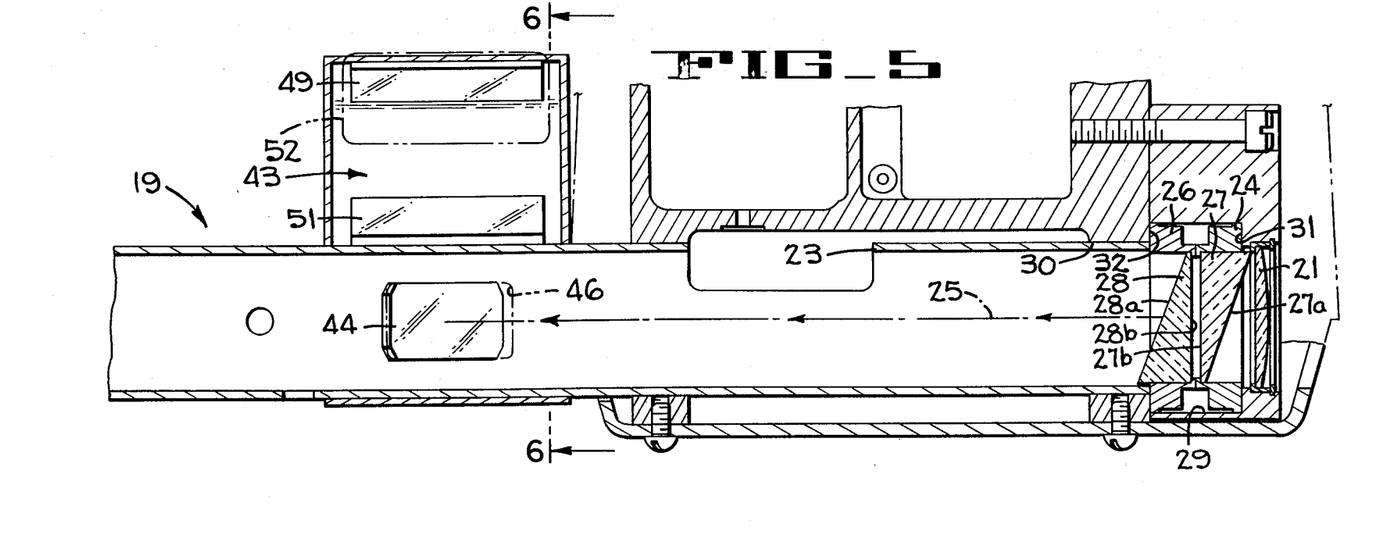
FIG. 5 is an elevation sectional view of the aimable viewfinder of FIG. 4.
Figure 7:
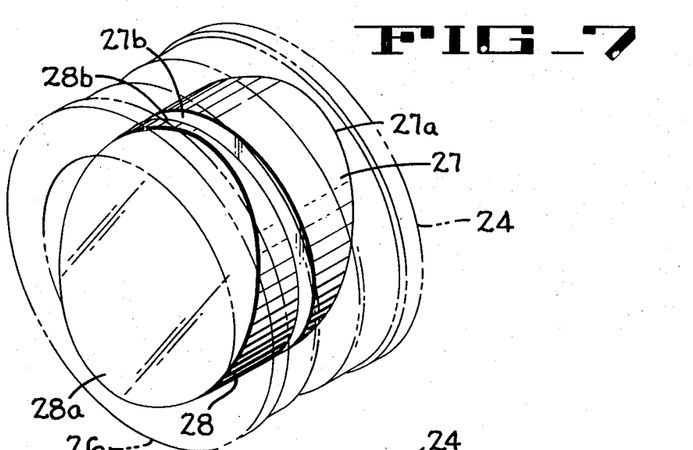
FIG. 7 is a perspective view showing a plano prism configuration used in the disclosed embodiment of the invention.

An aimable viewfinder 19 is shown in FIG. 4 having an objective lens 21 exposed to light rays from an object located on a viewing path 22 extending from the viewfinder. The viewing path therefore extends from the rear side of the alignment heads 11 and 12 as seen in FIG. 1. The viewing path 22 may be adjusted through a limited angle alpha ($\alpha$) on either side of the viewing path 22 in a substantially horizontal plane as shown in FIG. 4. The objective lens 21 is mounted in an aperture in the rear of the existing alignment head structure. A tubular member 23 is fixed in the alignment head surrounding an optical axis 25 extending through the lens. Adjacent to the objective lens 21 and on the image side of the lens, is a pair of holding rings 24 and 26, as seen in any of FIGS. 4, 5, 7 or 8. Fixed in the holding rings are a pair of plano prisms 27 and 28. The holding rings are mounted in a groove 29 formed in the interior of the alignment head structure so that they may rotate about the optical axis 25 of the objective lens 21. The holding rings 24 and 26 are captured between a shoulder 31 adjacent to the mounting boss for the objective lens and a shoulder 32 which is adjacent to a bore 30 in the alignment head structure which surrounds and engages the outside diameter of a tube member 23 (FIGS. 4 and 5).

Figure 8:
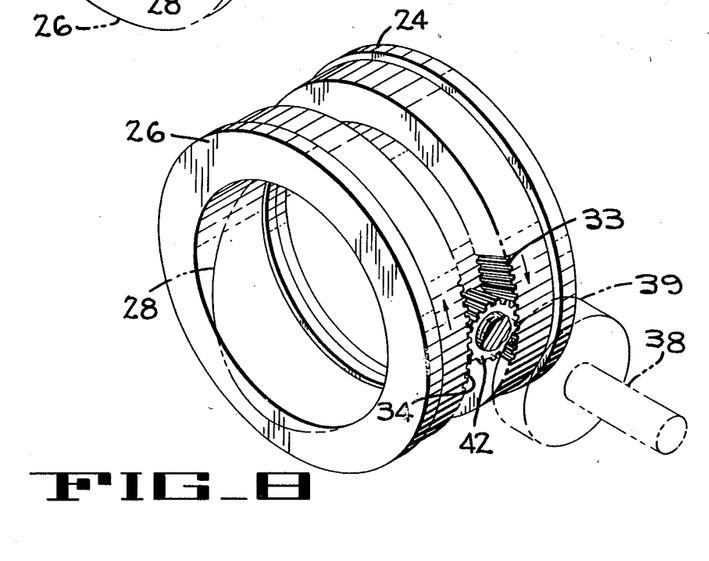
FIG. 8 is a perspective view showing a turning mechanism for the plano prisms in the disclosed embodiment.

A bevel gear 33 is formed on the holding ring 24 and a facing bevel gear 34 is formed on the holding ring 26 as best seen in FIG. 8. The alignment head outer structure has a bore 36 therethrough in which is situated a bearing 37 supporting shaft 38 for rotation therein. The shaft extends through a rotary potentiometer 39 and is engageable at a knob 41 mounted on an accessible extension of the shaft 38. The shaft has a bevel pinion 42 disposed on the inward end thereof which engages the bevel gears 33 and 34 simultaneously. It may thus be seen that if the knob 41 is turned, the potentiometer wiper (not shown) is also turned, providing an output change from the rotary potentiometer 39. The shaft 38 and the bevel pinion 42 are also turned which causes the bevel gears 33 and 34 and the holding rings 24 and 26 to rotate in opposite directions within the groove 29.

The plano prisms 27 and 28 are fixedly mounted within the holding rings 24 and 26 respectively. As may be seen in FIGS. 5 or 7, the prisms have flat angled faces 27a and 28a on one side and flat faces 27b and 28b on the other side. The latter flat faces are perpendicular to the cylindrical outer surfaces of the prisms and are mounted in the rings so that they are adjacent, parallel to one another and situated substantially perpendicular to the optical axis 25 through the tube member 23. The angled faces 27a and 28a are situated parallel to one another when the plano prisms are oriented so as to cause no lateral deflection through any portion of the angle alpha for the rays passing through the objective lens 21 from an object on the viewing path 22. This orientation of the plano prisms may be seen in FIGS. 5 and 7, wherein the prism 27 causes an upward deflection of rays passing through the objective lens and the plano prism 28 causes an equal and opposite downward deflection. Therefore, the rays passing through the plano prisms when oriented as shown in FIG. 5 will proceed through the tube member 23 in the same direction as they approach the objective lens from the object. However, when the knob 41 is rotated causing one holding ring and plano prism to rotate in one direction and the other holding ring and plano prism to rotate in the opposite direction, while the vertical components of ray deflection will continue to cancel out, the lateral ray deflection components will add. Therefore, the rays passing through the objective lens 21 will appear to be adjusted angularly as they proceed through the tube member 23 apparently swinging through some portion of the angle alpha to one side or the other of the viewing path 22 dependent on the degree to which and the direction in which the knob 41 is turned. The rotary potentiometer 39 will provide an electrical output which is indicative of the rotation imparted to the plano prisms and therefore indicative of the angle in the substantially horizontal plane through which the rays from the object being viewed are deflected. This may be seen to be distinct from the practice wherein purely mechanical adjustment is provided as disclosed in copending U.S. patent application Ser. No. 261,440 filed of even date herewith and issued Mar. 1, 1983 as U.S. Pat. No. 4,375,130.

The objective lens 21 in this embodiment may have a focal length of approximately 11 inches. Considering the wheel bases of most vehicles on which this equipment is intended to be used, an optical assembly shown generally at 43 is mounted at a distance along the tube member from the objective lens which is about at the back focal distance of the objective lens for objects about wheel base distance in front of the lens. The optical assembly includes a vertically disposed plane mirror 44 mounted at about a 45° angle to a diameter of the tube member. Mirror 44 intercepts rays traveling through the tube member and reflects them through an opening 46 in the side of the tube member to impinge upon an oblique plane mirror 47 which is mounted just outside the tube member. The oblique mirror is mounted at an angle which is nearly 45° with the vertical if the rays are to be reflected directly from the oblique mirror to a viewing lens. The oblique mirror is mounted on the path of rays passing through the objective lens substantially at the aforementioned back focal distance of the lens. In this example the back focal distance may be approximately 12⅝ inches. Therefore, a real image is constructed approximately at the surface of the oblique mirror 47. An index line 48 is formed from top to bottom centrally on the surface of the mirror. The index line will therefore appear superimposed on the real image constructed by the objective lens to an observer of the rays reflected from the oblique mirror 47.

If it is desirable or required to erect the real image formed by the objective lens 21 at the oblique mirror 47, an arrangement of erecting mirrors 49 and 51 as shown in FIG. 6 may be used. The image may thereby be erected before the rays are directed to a viewing lens 52 which may provide some magnification, by a factor of 2 for example, for the image for presentation to an observer. The observing point is ideally situated at an eye relief distance of about 8 to 12 inches from the surface of the viewing lens 52 to that an operator will not have to stoop too close to the viewing lens to ascertain the direction in which the aimable viewfinder is being aimed.

Returning now to FIG. 1 of the drawings, the viewing path or lines of sight 22 may be seen emanating from the rear portions of the alignment heads 11 and 12. The lines of sight are directed toward points 53 and 54 which are equidistant from a point along the centerline 16 of the vehicle chassis. Specifically, the points 53 and 54 are equidistant from the midpoint between the non-steerable wheels 17 and 18 and are therefore any two similar points on opposite sides of the vehicle chassis. The reference position for the viewing path 22 is in a direction which is parallel to the rotation planes of the wheels upon which the aligner heads are mounted, the front steerable wheels 13 and 14 in the embodiment of FIG. 1. The viewing paths 22 may be seen to diverge from the reference direction by an angle AR for the steerable wheel 13 and AL for the steerable wheel 14.

A mounting error known as runout is usually present when an alignment head is mounted on a vehicle wheel. The alignment heads utilized herein may have runout compensation structure included therein such as that disclosed in U.S. Pat. No. 4,180,915, Lill et al, issued Jan. 1, 1980; U.S. Pat. No. 4,192,074, Chang, issued Mar. 11, 1980; or U.S. Pat. No. 4,138,825, Pelta, issued Feb. 13, 1979. Such a runout angle for a particular rotational position of the right steerable wheel 13 is shown as ER and for the left steerable wheel 14 as EL in FIG. 1. Runout compensation values in accordance with the runout angles may be stored in a micro-computer (not shown) which is associated with the alignment heads 11 and 12 so that the departure angle signals for the sighting system of each wheel may be corrected to bring the "home" position for each sighting system effectively precisely parallel to the plane of its associated wheel.

With the foregoing in mind the following quantity definitions and relationships provide information identifying individual steerable wheel toe in relation to the vehicle chassis centerline 16 as seen in FIG. 1. It should be noted that the quantities AR and AL as combined and corrected here provide a quantity which is indicative of the average steering direction of the steerable wheels 13 and 14. The quantities R and L are signals generated by the alignment heads 11 and 12 respectively which relate to the individual toe of the steerable wheels.

$AL$ = SIGNAL VALUE FROM $L$ AIMABLE SIGHT (POS. IN)
$AR$ = SIGNAL VALUE FROM $R$ AIMABLE SIGHT (POS. IN)
$L$ = TOE SIGNAL VALUE OF $L$ PROJECTOR
$R$ = TOE SIGNAL VALUE OF $R$ PROJECTOR
$EL$ = RUNOUT VALUE OF $L$ UNIT MOUNTING (STORED)
$ER$ = RUNOUT VALUE OF $R$ UNIT MOUNTING (STORED)
$S$ = AV. STEERING DIRECTION OF FRONT WHEELS $$= \frac{(AL - EL) - (AR - ER)}{2}$$ (POS. CW FROM CENTERLINE)

$Tav$ = ½ TOTAL TOE (POS. IN AT FRONT)

$$= \frac{(L - EL) + (R - ER)}{2}$$

$TL$ = ACTUAL $L$ TOE AR SETTING $$= Tav + S = \frac{(L + R) + (AL - AR)}{2} - EL$$

$Kt$ = CORRECTION FACTOR FOR INDIVIDUAL TOE $$= L - TL = \frac{(L - R) - (AL - AR)}{2} + EL \text{ (STORE)}$$

$tL = L - Kt$ = CORR. $L$ TOE AT ANY SETTING (DISPLAY)
$tR = R + Kt$ = CORR. $R$ TOE AT ANY SETTING (DISPLAY)

The foregoing illustrates how the quantities are combined to provide an average steering direction quantity for the steerable front wheels 13 and 14 as well as how an actual toe setting signal TL is obtained for the left steerable wheel 14 by utilizing one half the total toe signal provided by the alignment heads 11 and 12 and the average steering direction signal. The actual left toe is obtained in accordance with the appropriate sign conventions by adding the average steering direction signal to the one half total toe signal to obtain the actual left toe indicative signal and by subtracting the average steering direction signal from the one half total toe signal to obtain the actual right toe indicative signal in the embodiment of FIG. 1. Once the alignment heads 11 and 12 have been set up as shown in FIG. 1 a correction factor may be obtained by comparing the individual toe signal (L or R) provided by either alignment head with the actual toe indicative signal (TL or TR). The difference between the signals is equivalent to a correction factor which may then be stored and utilized for correcting the individual toe signal (L or R) provided by each alignment head (12 or 11) while the toe of either of the front steerable wheels 14 or 13 is adjusted or the steering direction of both wheels is changed. Sign convention requires that the correction factor be continuously added to the signal from the left projector and continuously subtracted from the signal from the right projector.

Figure 2:
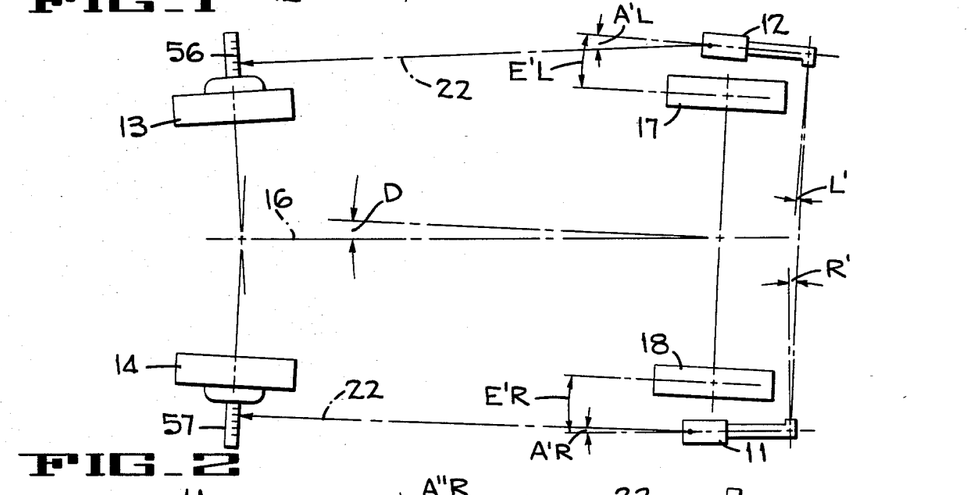
FIG. 2 is a diagrammatic plan view showing the apparatus and method of the present invention utilized to measure individual non-steerable wheel toe relative to a vehicle chassis centerline.

With reference now to FIG. 2 of the drawings the pair of front steerable wheels 13 and 14 are shown together with a pair of non-steerable rear wheels 17 and 18 with the alignment heads 11 and 12 mounted on the non-steerable rear wheels. The alignment heads are reversed on the rear wheels in order to find clearance under the vehicle for the cross toe measurements L' and R' as shown in FIG. 2. As a result the sign of the toe signal must be changed and the values derived by the alignment head 12 must be displayed on the right meter and the values derived by the alignment head 11 must be displayed on the left meter because they are mounted on the right and left rear wheels respectively. A front and rear wheel mode selection switch (not shown) is provided so that the switch may be selected to the position which conforms with the position at which the alignment heads are mounted, front or rear. A correction factor switch (not shown) is also provided so the appropriate correction factors and average rear wheel rolling direction signal may be stored when appropriate.

With the alignment heads 11 and 12 mounted on the non-steerable rear wheel pair 17 and 18, targets 56 and 57 about 7 inches in length and having graduated scales thereon are mounted at the axes of the front steerable wheel 13 and 14 as shown. The aimable viewfinders as disclosed hereinbefore are adjusted by means of the knobs 41 (FIG. 4) so that the index lines 48 in each of the aimable viewfinders appears at the same graduated point on the target graduated scales 56 and 57 or at any two similar points on opposite sides of the chassis as hereinbefore described. The viewing paths 22 are therefore directed to points which are equidistant from a point on the chassis centerline, specifically the midpoint between the front steerable wheels 13 and 14. An electrical signal is therefore generated by each potentiometer 39 in the aimable viewfinders 19, wherein the signals are indicative of the angles A'L and A'R as seen in FIG. 2. The runout errors E'L and E'R are obtained as hereinbefore described and together with the individual toe signal values L' and R' are used to perform calculations in accordance with the following relationships.

$D$ = AV. REAR ROLL DIRECTION (POS. CW)

$$= \frac{(A'L - E'L) - (A'R - E'R)}{2}$$ (STORE FOR FRONT TOE COMP.)

$Tav = \frac{1}{2}$ TOTAL REAR TOE (POS. IN AT REAR)

$$= \frac{(L' - E'L) + (R' - E'R)}{2}$$

$TL$ = REVERSED ACTUAL $R$ REAR TOE $$= Tav + D = \frac{(L' + R') + (A'L - A'R)}{2} - E'L$$

$K't$ = CORR. FACTOR FOR INDIV. REAR TOE $$= L' - TL = \frac{(L' - R') - (A'L - A'R)}{2} + E'L \text{ (STORE)}$$

$t'L$ = INDIV. RIGHT REAR TOE
$= (L' - K't) \times (-1)$ (DISPLAY ON $R$ METER)
$t'R$ = INDIV. LEFT REAR TOE
$= (R' + K't) \times (-1)$ (DISPLAY ON $L$ METER)

Figure 9:
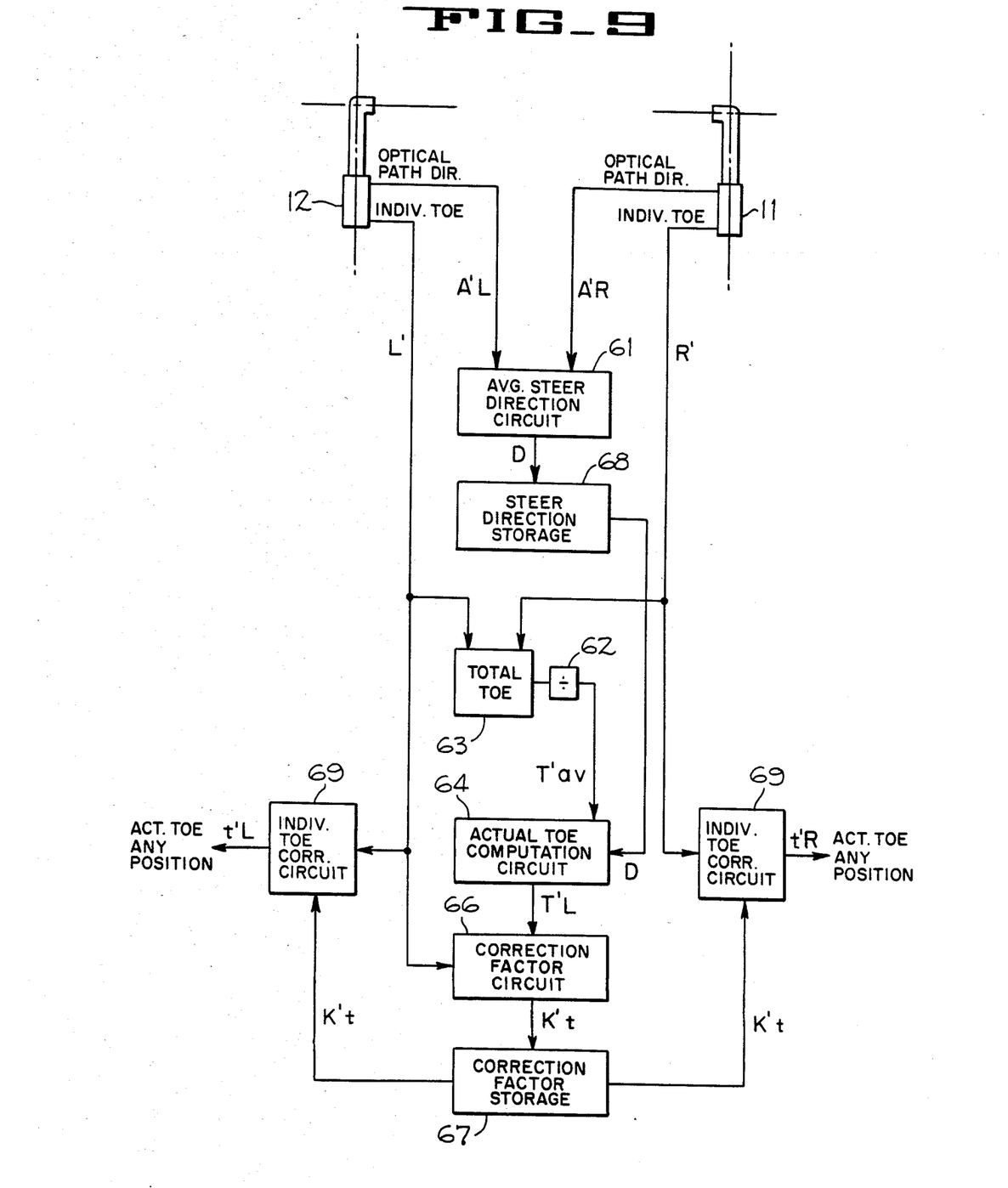
FIG. 9 is a block diagram showing one embodiment of the present invention.

It may be seen from the foregoing relationships that the quantity D is representative of the average rolling direction of the pair of rear wheels 17 and 18 and is obtained by combining the signals which indicate the deviations of the lines of sight 22 from a direction parallel to the planes of the wheels 17 and 18 in an average steering direction circuit 61 shown in FIG. 9. The actual toe for the left rear wheel is computed relative to the chassis centerline 16 by adding the average rolling direction for the rear wheels to a quantity provided by the alignment heads from circuitry 62 (FIG. 9) contained therein, such quantity being equal to one half of the total toe of the rear wheels. Total toe is obtained from a total toe circuit 63 receiving the individual toe signals from the heads 11 and 12 as disclosed in the U.S. Pat. Nos. 4,097,157 and 4,150,897 mentioned hereinbefore. A signal T'L indicative of actual toe for the right rear wheel is computed by subtracting the rear rolling direction quantity from the half total rear toe signal in a circuit 64 as seen in FIG. 9. The correction factor K't may be computed in a correction factor circuit 66 shown in FIG. 9 with the set up as described for FIG. 2 by subtracting the actual rear toe for either wheel from the individual toe signal value provided by the corresponding alignment head. With the alignment mode switch set to the rear position, a correction factor switch is actuated which stores the correction factor in a correction factor storage 67 and average rear rolling direction signals in a steering direction storage 68 to be used for purposes to be hereinafter described. The correction factor K't is used to provide the corrected individual rear toe display signal from an individual toe correction circuit 69 for each rear wheel so that subsequent rear wheel toe adjustment may be appropriately corrected when made for the chassis for which the rear wheel toe correction factor K't was obtained.

Figure 3:
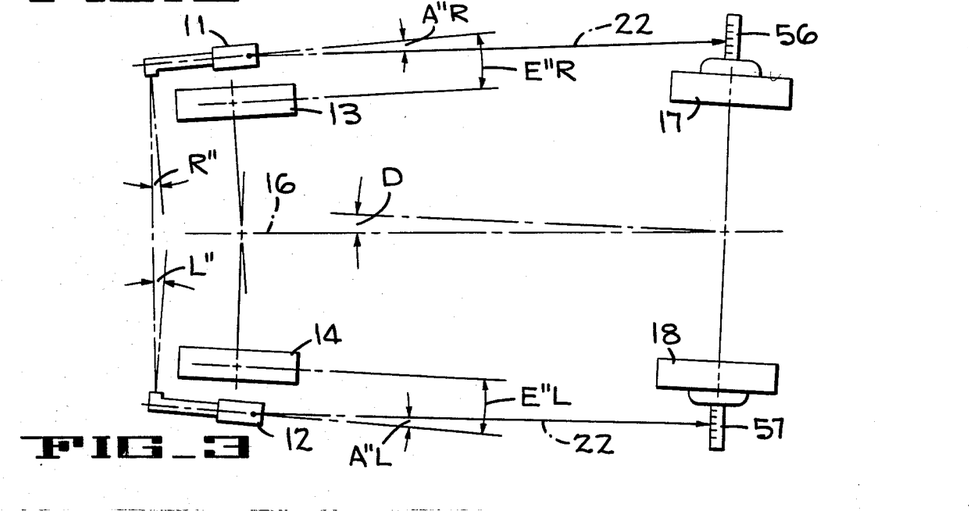
FIG. 3 is a diagrammatic plan view showing the apparatus and method of the present invention utilized to measure individual steerable wheel toe relative to the non-steerable wheel average rolling direction.
Figure 10:
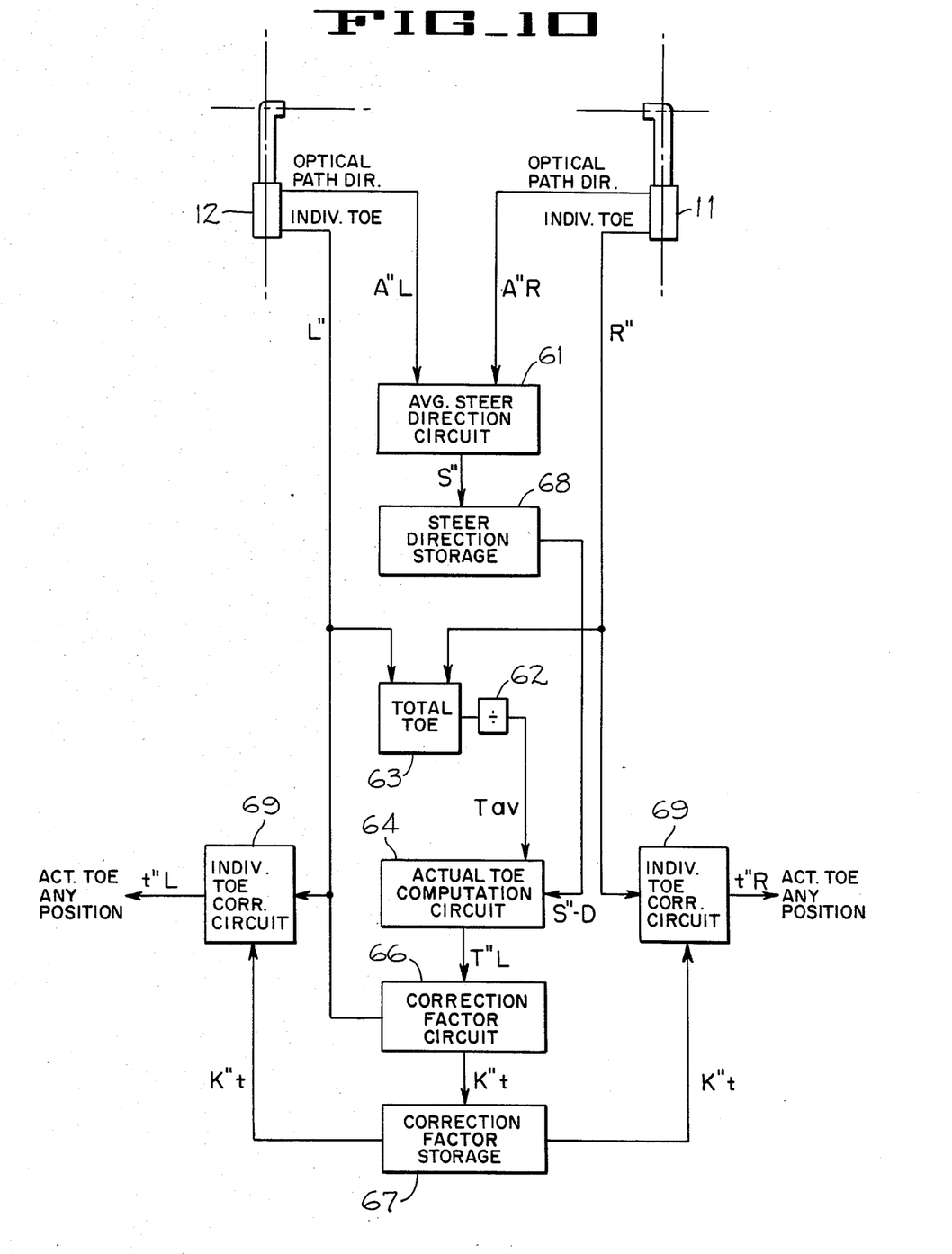
FIG. 10 shows the utilization of the combination of FIG. 9 with the alignment heads on a steerable wheel pair.

Subsequent to obtaining the rear wheel toe relative to the chassis centerline 16 and the signal indicative of the average rear wheel rolling direction the aligner heads 11 and 12 are removed from the left and right rear wheels 18 and 17 respectively and mounted on the right and left front steerable wheels 13 and 14 respectively as shown in FIG. 3. FIG. 10 contains the same elements as FIG. 9 described hereinbefore, but has the signal lines labeled to indicate the signals obtained by means of the following description of adjustments to and computations by the various elements common to FIGS. 9 and 10 when the alignment heads are mounted on the steerable wheels. Once again the aimable viewfinders are aimed at a pair of points which are equidistant from a point on the vehicle centerline, preferably the mid-point between the non-steerable wheels 17 and 18. The points are identified in the embodiment of FIG. 3 by directing the viewing paths or lines of sight 22 to like points on the scales 56 and 57 now mounted on the axes of the non-steerable wheels 17 and 18 respectively or to similar points on opposite sides of the vehicle chassis such as represented by points 53 and 54 in FIG. 1. The aiming of the viewfinders generates an electrical signal ($A''L$ and $A''R$ which is proportional to the angle between the optical axis or line of sight and the plane of the steerable wheel on which a particular alignment head 11 or 12 is mounted. Electrical signals are obtained from the alignment system which are indicative of the total toe angle between the planes of the front wheels 13 and 14 so that the average steering direction of the front wheels may be obtained as described in conjunction with the description of FIG. 1. Having thus obtained a signal which is indicative of a portion (one half) of the total toe between the front wheels (Tav), a signal which is indicative of the average steering direction of the front wheels ($S''$), and having fetched a signal from storage which is indicative of the average rear wheel rolling direction (D), a combination of the signals in the actual toe computation circuit 64 provides for actual front wheel toe settings $T''L$ as shown in the relationships immediately following.

$D$ = AV. REAR ROLLING DIRECTION
   (STORED DURING REAR WHEEL CHECK)
$T'L$ = ACTUAL $L$ TOE AT SETTING $$= Tav + S'' - D = \frac{(-L'' + R'') + (A''L - A''R)}{2} -$$

$$E''L - D$$

$$K''t = L'' - T'L = \frac{(L'' - R'') - (A''L - A''R)}{2} + E''L + D$$

$t''L = L'' - K''t$ (DISPLAY ON $L$ METER)
$t''R = R'' + K''t$ (DISPLAY ON $R$ METER)

It may be seen from the foregoing and from FIG. 10 that a correction factor for the front steerable wheels $K''t$ may be obtained from the signals obtained from the specific set-up described immediately hereinbefore by comparing an individual toe reading ($L''$ or $R''$) from one of the alignment heads 11 or 12 with the actual toe at that particular setting for either the left steerable wheel 13 ($T''L$) or the right steerable wheel 14 ($T''R$) respectively. The correction factor $K''t$ obtained is placed in storage 67 by actuating the correction factor switch (not shown) while the front and rear alignment switch is in the front position. As explained hereinbefore, the correction factor is continuously added to the signal $L''$ from the left alignment head 12 and continuously subtracted from the signal $R''$ obtained from the right alignment head 11. The correction factor $K''t$ may thus be combined with the individual toe indicative signals $L''$ and $R''$ from the alignment heads to continuously obtain a corrected toe signal $t''L$ and $t''R$ for display while individual wheel toe is being adjusted or the steering direction is being changed. The correction factor is constant for any of the situations for FIGS. 1 through 3 described herein and may be obtained by one careful set-up of the alignment heads 11 and 12 and aimable viewfinders 19 contained therein. Thereafter, having stored the correction factor, no special care need be taken in adjusting individual toe of the wheels on the vehicle to assume predetermined toe angle inclinations, while nonetheless being assured of corrected toe inclination displays.

Although the best mode contemplated for carrying out the present invention has been herein shown and described, it will be apparent that modification and variation may be made without departing from what is regarded to be the subject matter of the invention.

What is claimed is:

1. A method of measuring toe for wheels supporting a vehicle chassis wherein the wheels include pairs of non-steerable and steerable wheels, utilizing a pair of alignment heads adapted to be mounted on ones of the wheels and providing signals indicative of the individual toe of the wheels on which the heads are mounted, and an optical system incorporated in each head having an aimable optical axis extending therefrom, comprising the steps of mounting an alignment head on each of the non-steerable wheels, aiming each optical axis in a fixed direction at separate ones of a pair of points equidistant from a point on the centerline of the vehicle chassis, providing an electrical signal indicative of the angular departure of each aimed optical axis from the plane of the non-steerable wheel on which the respective head is mounted, combining the angular departure signals and providing and storing an average rolling direction value for the non-steerable wheels, calculating a value indicative of the total toe of the non-steerable wheels utilizing the individual toe signals, combining one-half of the total toe value with the average rolling direction value to obtain an actual toe value, comparing the actual and individual toe values to obtain a toe correction value, removing the alignment heads from the non-steerable wheels and mounting them on the steerable wheels, aiming each optical axis in a fixed direction at separate ones of a pair of points equidistant from the centerline of the vehicle chassis approximately at the position of the non-steerable wheels, providing an electrical signal indicative of the angular departure of each aimed optical axis from the plane of the steerable wheel on which the respective head is mounted, calculating a value indicative of total toe of the steerable wheels utilizing the steerable wheel individual toe signals, combining one-half of the steerable wheel total toe and the angular departure signals with the stored non-steerable wheel rolling direction signal so that an actual toe angle signal for each steerable wheel is obtained which is referenced to the non-steerable wheel average rolling direction, comparing the actual toe for one steerable wheel with the individual toe for that wheel to obtain a steerable wheel toe correction factor, and storing the steerable wheel correction factor for application to steerable wheel individual toe for other steering angles and toe adjustments.

2. A method of measuring alignment of wheel pairs on a wheel supported vehicle relative to the vehicle chassis centerline using only a single pair of wheel alignment heads, wherein each alignment head contains an aimable optical system, comprising the steps of
mounting one wheel alignment head on each one of the non-steerable wheels so that the alignment heads develop a signal indicative of the individual toe of each non-steerable wheel,
calculating a total toe value between the non-steerable wheels utilizing the individual toe signals,
aiming each optical system in a fixed direction toward respective points equidistant from a point on the chassis centerline and generally longitudinally disposed along the vehicle chassis,
measuring the departure of each aimed optical system from the plane of the non-steerable wheel on which mounted and providing an electrical signal indicative thereof,
comparing the departure signals to obtain a steering value indicative of the average steering direction for the non-steerable wheel pair relative to the chassis centerline,
combining one-half of the total toe value and the steering value to obtain an actual toe value,
comparing the actual toe value with an individual toe value to obtain a non-steerable wheel toe correction factor,
storing the steering signal as a non-steerable wheel pair rolling direction signal referenced to the chassis centerline,
mounting the wheel alignment heads on the steerable wheels,
aiming the optical systems in fixed directions at respective points equidistant from a point on the chassis centerline and generally longitudinally disposed along the vehicle chassis,
measuring the departure of each aimed optical system from the plane of the steerable wheel on which mounted and providing an electrical signal indicative thereof,
comparing the departure signals to obtain a steering signal indicative of the average steering direction of the steerable wheel pair relative to the chassis centerline, and
combining one half of the total toe signal for the steerable wheels with the steering signal and the rolling direction signal to obtain a steerable wheel toe indicative signal relative to the non-steerable wheel rolling direction.

3. A method as in claim 2 wherein said alignment heads provide an individual toe signal for the wheel on which they are mounted, together with the steps of
comparing the individual toe signal with the steerable wheel toe indicative signal to thereby obtain an individual steerable wheel toe correction factor,
storing the toe correction factor, and
applying the stored correction factor to individual steerable wheel toe signals measured relative to the same vehicle chassis, whereby corrected individual toe indications are obtained while individual steerable wheel toe is adjusted or the steering direction is changed.

4. A method of measuring individual toe of a pair of non-steerable and a pair of steerable wheels supporting a vehicle chassis, wherein a pair of alignment heads provide signals related to individual toe of the wheel on which an alignment head is mounted and relative to total toe of the wheels on which the pair of heads is mounted, and wherein an optical system is incorporated in each head having an optical path which is aimable over an angular range and providing a directional signal indicative of the direction in which the optical system is aimed, comprising the steps of
mounting one alignment head on each of the wheels of the non-steerable wheel pair,
orienting the optical paths to intercept points equidistant from a center point between the steerable wheels,
combining the directional signals to obtain a signal indicative of non-steerable wheel average rolling direction relative to the chassis centerline,
combining the average rolling direction signal and one half the total toe signal to obtain an actual individual toe signal for one of the non-steerable wheels relative to the chassis centerline,
comparing the non-steerable wheel actual toe signal with the respective individual toe signal to obtain an individual non-steerable wheel toe correction factor,
storing the average rolling direction and non-steerable wheel toe correction factor signals,
removing the alignment heads from the non-steerable wheels and mounting one head on each of the wheels of the steerable pair,
orienting the optical paths to intercept points equidistant from a center point between the non-steerable wheels,
combining the directional signals to obtain a signal indicative of steerable wheel average steering direction relative to the vehicle centerline,
combining one half the signal indicative of the total toe between the steerable wheels, the steering direction signal and the stored average rolling direction signal to obtain an actual individual toe signal for one of the steerable wheels relative to the average non-steerable wheel rolling direction,
comparing the steerable wheel actual toe signal with the respective steerable wheel individual toe signal to obtain an individual steerable wheel toe correction factor, and
storing the last named correction factor, whereby the stored correction factors may be applied to individual steerable and non-steerable wheel toe signals measured relative to the same vehicle chassis thereby providing corrected individual toe indications while wheel toe is being adjusted or steering direction is being changed.

5. Apparatus for measuring alignment of a non-steerable wheel pair and a steerable wheel pair on a wheel supported vehicle relative to the centerline of the vehicle chassis comprising,
a pair of alignment heads providing an individual wheel toe signal convertible to a value indicative of total toe between wheels in each pair when mounted thereon,
means for mounting said alignment heads on each wheel of each pair equidistant from a midpoint between the wheels,
an optical system in each alignment head providing an optical path extending in a direction generally longitudinal of the vehicle chassis, means for adjusting said optical path direction to intercept like points on opposite sides of the vehicle chassis and displaced along said direction longitudinal of the vehicle chassis means coupled to said means for adjusting for providing an electrical output signal indicative of said optical path direction relative to the direction of respective ones of the wheel planes in the wheel pair, means for receiving said electrical output signals and for providing a steering value indicative of an average rear wheel rolling direction relative to the chassis centerline for the non-steerable wheel pair when mounted thereon and indicative of an average steering direction value relative to the chassis centerline for the steerable wheel pair when mounted thereon when said optical systems are adjusted so that said optical paths intercept points displaced therefrom longitudinally of the chassis and substantially equidistant from a point on the centerline of the chassis, means for storing said rear wheel pair average rolling direction value relative to the chassis centerline, means for combining one-half of the total toe value of the wheel pair and said average steering direction value for the wheel pair to obtain an actual toe value for a steerable wheel when said heads are mounted on steerable wheels and for a non-steerable wheel when said heads are mounted on non-steerable wheels, means for comparing said actual wheel toe value with a value corresponding to said individual wheel toe signal, thereby obtaining a wheel toe correction factor, and said means for combining further operating to combine said correction factor with said rear wheel pair average rolling direction value, whereby a correction factor is obtained for continuous application to steerable wheel individual toe output, so that steerable wheel toe values are actual toe values during toe adjustment and steering changes and are referenced to rear wheel rolling direction.

6. Apparatus as in claim 5 wherein the wheel pair is a non-steerable wheel pair and said means for comparing the individual toe signals with the actual non-steerable wheel toe signal when said alignment heads are mounted on the non-steerable wheel pair provides an individual non-steerable wheel toe correction factor, and means for storing said toe correction factor whereby it may thereafter be applied to individual non-steerable wheel toe signals measured by the aligner heads relative to the same vehicle chassis to obtain continuously corrected individual toe indications while non-steerable wheel toe is being adjusted.

* * * * *